(12) United States Patent
Reuss

(10) Patent No.: US 11,383,610 B2
(45) Date of Patent: Jul. 12, 2022

(54) CHARGING-SWITCHING ARRANGEMENT FOR A VEHICLE AND METHOD FOR A CHARGING-SWITCHING ARRANGEMENT

(71) Applicant: Bayerische Motoren Werke Aktiengesellschaft, Munich (DE)

(72) Inventor: Joerg Reuss, Unterschleissheim (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 529 days.

(21) Appl. No.: 16/554,762

(22) Filed: Aug. 29, 2019

(65) Prior Publication Data
US 2019/0381909 A1    Dec. 19, 2019

Related U.S. Application Data

(63) Continuation of application No. PCT/EP2018/056719, filed on Mar. 16, 2018.

(30) Foreign Application Priority Data

Apr. 13, 2017 (DE) ..................... 10 2017 206 423.4

(51) Int. Cl.
*B60L 53/62* (2019.01)
*B60L 53/12* (2019.01)
(Continued)

(52) U.S. Cl.
CPC .............. *B60L 53/62* (2019.02); *B60L 53/12* (2019.02); *B60L 53/60* (2019.02);
(Continued)

(58) Field of Classification Search
CPC .......... B60L 53/62; B60L 53/12; B60L 53/60; B60L 2210/30; B60L 2210/40;
(Continued)

(56) References Cited

U.S. PATENT DOCUMENTS

2014/0062183 A1    3/2014 Ichikawa
2018/0334043 A1*  11/2018 Zou .......................... B60L 53/20
(Continued)

FOREIGN PATENT DOCUMENTS

DE            41 07 391 A1    9/1992
DE    10 2010 027 719 A1    1/2012
(Continued)

OTHER PUBLICATIONS

International Search Report (PCT/ISA/210) issued in PCT Application No. PCT/EP2018/056719 dated Jun. 15, 2018 with English translation (four (4) pages).
(Continued)

*Primary Examiner* — Paul Dinh
(74) *Attorney, Agent, or Firm* — Crowell & Moring LLP

(57) ABSTRACT

A switching arrangement includes a switching unit, which is designed to couple at least one phase of an electric machine of a vehicle in different configurations to a DC onboard power voltage of the vehicle in order to generate an AC phase voltage for the phase of the electric machine. In addition, the switching arrangement has a coil and circuit breakers, wherein the circuit breakers are designed to couple the switching unit via the coil to a DC charging voltage or to decouple same from the charging voltage. The switching arrangement also has a controller which is designed to operate the switching arrangement in a converter mode or in a power inverter mode.

20 Claims, 9 Drawing Sheets

(51) Int. Cl.
*H02M 7/217* (2006.01)
*B60L 53/60* (2019.01)

(52) U.S. Cl.
CPC ....... *H02M 7/2173* (2013.01); *B60L 2210/30* (2013.01); *B60L 2210/40* (2013.01)

(58) Field of Classification Search
CPC ....... B60L 53/11; B60L 53/24; H02M 7/2173; Y02T 10/70; Y02T 10/7072; Y02T 90/12; Y02T 90/14
USPC .......................................................... 320/104
See application file for complete search history.

(56) References Cited

U.S. PATENT DOCUMENTS

| | | | | |
|---|---|---|---|---|
| 2021/0197680 A1* | 7/2021 | Lim | .................. | B60L 53/22 |
| 2021/0408889 A1* | 12/2021 | Zhu | .................. | B60L 53/24 |

FOREIGN PATENT DOCUMENTS

| | | |
|---|---|---|
| DE | 10 2016 209 905 A1 | 12/2016 |
| DE | 10 2016 206 945 A1 | 10/2017 |

OTHER PUBLICATIONS

German-language Written Opinion (PCT/ISA/237) issued in PCT Application No. PCT/EP2018/056719 dated Jun. 15, 2018 (six (6) pages).
German-language Search Report issued in counterpart German Application No. 10 2017 206 423.4 dated Nov. 30, 2017 with partial English translation (13 pages).
Subotic et al., "A Review of Single-Phase On-Board Integrated Battery Charging Topologies for Electric Vehicles," IEEE Workshop on Electrical Machines Design, Control, and Diagnosis, 2015, pp. 136-145, (10 pages).
Tan et al., "Effective Voltage Balance Control for Bipolar-DC-Bus-Fed EV Charging Station With Three-Level DC-DC Fast Charger," IEEE Transactions on Industrial Electronics, Jul. 2016, pp. 4031-4041, vol. 63, No. 7, (11 pages).

* cited by examiner

CHARGING-SWITCHING ARRANGEMENT FOR A VEHICLE AND METHOD FOR A CHARGING-SWITCHING ARRANGEMENT

CROSS REFERENCE TO RELATED APPLICATIONS

This application is a continuation of PCT International Application No. PCT/EP2018/056719, filed Mar. 16, 2018, which claims priority under 35 U.S.C. § 119 from German Patent Application No. 10 2017 206 423.4, filed Apr. 13, 2017, the entire disclosures of which are herein expressly incorporated by reference.

BACKGROUND AND SUMMARY OF THE INVENTION

The invention relates to a switching arrangement, in particular a DC-DC voltage converter, for charging the electrical energy store of a vehicle.

Vehicles having electrical propulsion (e.g., a plug-in hybrid electric vehicle (PHEV), or a battery electric vehicle (BEV)) comprise electrical energy stores (e.g., batteries) that can be connected to a charging station by means of a charging apparatus of the vehicle and charged. To charge the electrical energy stores of such electric and/or hybrid vehicles, various conductive, i.e., wired, charging technologies exist. In the case of what is known as AC charging or alternating current charging, the charger producing the direct current (also referred to as DC current) for charging the electrical energy store is located in the vehicle. A charging cable between the charging station and the vehicle is used to transfer an AC (alternating current) current. In the case of what is known as DC charging or direct current charging, the charger producing the direct current for charging the electrical energy store is located in the charging station. The charging cable is therefore used to transfer DC (direct current) current.

At the present time, DC charging typically involves a maximum voltage of 500 V and a maximum current of 120 A being used, charging currents of 350 A being meant to be possible in future. In order to increase the charging power further, the charging voltage is also meant to be increased to 800 V or 1000 V (for a maximum charging current of 350 A). As a result, the onboard electrical system voltage of a high voltage system of a vehicle is also increased to 800 V or 1000 V, which means that the vehicle cannot readily be charged at a 500 V charging station.

The present document is concerned with the technical object of enabling an at least partly electrically propelled vehicle having a relatively high onboard electrical system voltage (e.g., 800 V or 1000 V) to be charged at a charging station having a relatively low charging voltage (e.g., 500 V) in an efficient manner.

The object is achieved by the features of the independent patent claims. Advantageous embodiments are described in the dependent claims, inter alia. It is pointed out that additional features of a patent claim dependent on an independent patent claim are able, without the features of the independent patent claim or only in combination with a subset of the features of the independent patent claim, to form a separate invention, independent of the combination of all of the features of the independent patent claim, that can be made the subject matter of an independent claim, of a divisional application or of a subsequent application. This applies in the same manner to technical teachings described in the description that are able to form an invention independent of the features of the independent patent claims.

According to one aspect, a switching arrangement for a vehicle (in particular for a road motor vehicle) is described. The vehicle can comprise an electrical energy store for storing electrical energy. In addition, the vehicle can comprise an electrical machine that can be operated using energy from the energy store. The electrical machine can be used to propel the vehicle. The energy store can provide electrical energy at an onboard electrical system voltage. In this case, the onboard electrical system voltage can be, for example, in a region of 800 V or 1000 V.

The switching arrangement comprises a switching unit having multiple switches. In this case, a switch can comprise a transistor, in particular an IGBT (insulated gate electrode bipolar transistor) or a MOSFET (metal oxide semiconductor field effect transistor), and/or a semiconductor diode. At least some of the switches in this case can be arranged in series in order to form a half-bridge.

The switching unit is configured to couple at least one phase of the electrical machine (e.g., a three phase synchronous machine) of the vehicle to the DC onboard electrical system voltage of the vehicle in different configurations in order to generate an AC phase voltage and/or an AC phase current for the phase of the electrical machine. The switching unit can be part of an inverter configured to generate from the DC onboard electrical system voltage a three phase current for operating a three phase machine. The switching arrangement can have, e.g., L switching units for L different phases of the electrical machine, where L>1, e.g., L=3.

Additionally, the switching arrangement comprises at least one coil and isolating switches (e.g., two isolating switches per phase). The isolating switches in this case can be configured to couple the switching unit to a DC charging voltage or to decouple said switching unit from the charging voltage (or to couple it to a charging interface, for example, a charging socket, of the vehicle or to decouple it from the charging interface) via the coil. The charging voltage can be lower than the vehicle electrical system voltage.

A first isolating switch can couple or decouple a first point inside the switching unit to or from a first pole of the charging voltage via the coil. In addition, a second isolating switch can couple or decouple a second point inside the switching unit (possibly directly) to or from a second pole of the charging voltage. An isolating switch can comprise, e.g., an IGBT, a relay or a MOSFET. The isolating switches can therefore be used to provide a connection between the switching unit (and therefore between the onboard electrical system voltage) and the charging voltage. The coil and the switching unit can then be used in combination as a DC-DC voltage converter between the charging voltage (which is, e.g., in the region of 500 V) and the onboard electrical system voltage.

The switching arrangement further comprises a controller (e.g., a microprocessor). The controller is programmed so as, in a converter mode of the switching arrangement, to prompt the isolating switches to couple the switching unit to the charging voltage via the coil. It is therefore possible for a connection to be set up between the charging voltage (i.e., to the charging interface of the vehicle) and the switching arrangement and hence indirectly to the onboard electrical system voltage (i.e., to the energy store of the vehicle). Additionally, the controller is programmed so as, in the converter mode of the switching arrangement, to operate the switching unit such that the coil is used to convert electrical energy at the charging voltage into electrical energy at the onboard electrical system voltage. In particular, the switching unit can be operated in combination with the coil as a DC-DC voltage converter, e.g., as a boost converter, in particular as a three level boost converter.

Secondly, the controller is programmed so as, in an inverter mode of the switching arrangement, to prompt the isolating switches to decouple the switching unit from the charging voltage. The onboard electrical system voltage can therefore be decoupled from the charging voltage and/or from the charging interface in order to allow undisturbed inverter operation of the switching unit. The controller is further programmed so as, in the inverter mode of the switching arrangement, to operate the switching unit such that the onboard electrical system voltage is taken as a basis for generating the phase voltage and/or the phase current for the phase of the electrical machine.

A switching arrangement for a vehicle is therefore described that can provide both an inverter function and a DC-DC voltage converter function in a manner efficient in terms of installation space, weight and cost. This can allow 800 V energy stores in a vehicle to be charged using a 500 V charging station in an efficient manner.

The switching unit can comprise at least one first switch (e.g., at least one high side switch) configured to couple or decouple the phase of the electrical machine to or from a first pole (e.g., to or from a positive pole) of the onboard electrical system voltage. In addition, the switching unit can comprise at least one second switch (e.g., at least one low side switch) configured to couple or decouple the phase of the electrical machine to or from a second pole (e.g., to or from a negative pole) of the onboard electrical system voltage. In this case, the one or more first and second switches can form a half-bridge for the onboard electrical system voltage. This means that the one or more first and second switches can be arranged in series with one another between the two poles of the onboard electrical system voltage. The phase of the electrical machine can then be coupled to a midpoint of the half-bridge.

Such a half-bridge can provide at least one two level inverter in which the midpoint of the half bridge is coupled to the first pole or to the second pole of the onboard electrical system voltage in order to replicate an AC voltage (e.g., a sinusoidal AC voltage).

Secondly, such a half bridge in combination with the coil can provide at least one two level DC-DC voltage converter, in particular a boost converter, between the charging voltage and the onboard electrical system voltage. For this purpose, the coil can be arranged between the midpoint of the half bridge and the first pole of the charging voltage (via the first isolating switch). In addition, the second pole of the onboard electrical system voltage can be coupled to the second pole of the charging voltage (via the second isolating switch). Alternating activation of the first switch or the second switch in a sequence of PWM (pulse width modulation) periods can then effect a DC-DC voltage conversion.

An efficient combination of an inverter and a DC-DC voltage converter is therefore made possible.

The controller can be configured so as, in a converter mode, to actuate the switching unit in order to take the charging voltage as a basis for sequentially arranging the coil directly or indirectly between the first and second poles of the charging voltage in a first portion of a PWM period in order to magnetize the coil, and arranging the coil between the first pole of the onboard electrical system voltage and the first pole of the charging voltage in a second portion of a PWM period in order to demagnetize the coil. This sequence of portions can be repeated periodically in order to transfer electrical energy from the charging socket of the vehicle to the electrical energy store.

The switching arrangement can have one or more capacitors that are arranged between the first and second poles of the onboard electrical system voltage. The one or more capacitors can be used both in the converter mode and in the inverter mode to smooth the onboard electrical system voltage.

In particular, the switching arrangement can comprise a capacitive voltage divider having at least two series capacitors. The at least two series capacitors can be arranged in series between the two poles of the onboard electrical system voltage, and can split the onboard electrical system voltage into two or more (possibly identical) voltage elements. The use of a capacitive voltage divider can provide more than two voltage levels. This is advantageous both for the converter mode and for the inverter mode. In particular, this allows uniform operation of the electrical machine, on the one hand, and a uniform charging current, on the other hand, to be provided.

The switching unit can comprise at least two first series switches (in particular high side switches) configured to couple or decouple the phase of the electrical machine (i.e., the midpoint of the half bridge) to or from the first pole of the onboard electrical system voltage. In addition, the switching unit can comprise a first neutral switch configured to couple or decouple a voltage division point between the two capacitors of the capacitive voltage divider to or from the midpoint between the two first series switches. Such an arrangement of switches can provide a neutral voltage level (between the potential of the first pole and the potential of the second pole of the onboard electrical system voltage).

In a corresponding manner, the switching unit can comprise at least two second series switches (in particular two low side switches) configured to couple or decouple the phase of the electrical machine (i.e., the midpoint of the half bridge) to or from the second pole of the onboard electrical system voltage. Additionally, the switching unit can comprise a second neutral switch configured to couple or decouple the voltage division point to or from the midpoint between the two second series switches.

Overall, it is therefore possible for a switching unit for a 3 level inverter to be provided. This switching unit can then be used to provide a 3 level DC-DC voltage converter, in particular a 3 level boost converter. The controller can be programmed so as, in the inverter mode, to actuate the switching unit to take the onboard electrical system voltage as a basis for generating a positive, a negative and a neutral level for the phase voltage. As such, stable operation of the electrical machine can be made possible.

Secondly, the controller can be programmed so as, in the converter mode, to actuate the switching unit to take the charging voltage as a basis for sequentially magnetizing the coil via a first of the capacitors; demagnetizing the coil via the capacitors of the capacitive voltage divider; magnetizing the coil via a second of the capacitors; and demagnetizing the coil via the capacitors of the capacitive voltage divider. This succession can be repeated in a sequence of PWM periods in order to convert electrical energy at the charging voltage into electrical energy at the onboard electrical system voltage. As such, a stable charging current for charging the energy store of the vehicle can be provided.

The coil can be coupled firstly to the midpoint between the two first series switches and secondly, in particular via the first isolating switch, to the first pole of the charging voltage. In addition, the midpoint between the two second series switches can be coupled, in particular via the second isolating switch, to the second pole of the charging voltage.

The controller can be programmed so as, in the converter mode, to actuate (in particular to open) a first switch and a second switch in order to decouple both the coil and the second pole of the charging voltage from the midpoint of the half bridge (and hence from the phase of the electrical machine). In particular, the first switch coupled directly to the midpoint of the half bridge and the second switch coupled directly to the midpoint of the half bridge can be opened in the converter mode. As such, particularly energy-efficient DC-DC voltage converter operation can be made possible, since the switching unit is decoupled from the electrical machine.

The switching arrangement can comprise L switching units for L phases of the electrical machine, where L>1 (e.g., L=3). In addition, the switching arrangement can comprise L coils and L sets of isolating switches that are each coupled to one of the L switching units and to the charging voltage. The controller can be configured so as, in the converter mode, to operate the L switching units such that L parallel DC-DC voltage converters are provided between the charging voltage and the onboard electrical system voltage. As such, the charging power transferred via the switching arrangement can be increased. The DC-DC voltage converters can be operated in phase-shifted fashion (e.g., with a phase offset of 360°/L). This allows the ripple in the charging current to be reduced.

According to a further aspect, a method for operating a switching arrangement described in this document is described. The method comprises ascertaining whether the switching arrangement is meant to be operated in a converter mode or in an inverter mode. By way of example, it is possible to ascertain whether a charging process is meant to be performed or whether the vehicle is in driving mode. The method comprises, when the switching arrangement is meant to be operated in the converter mode, prompting the isolating switches to couple the switching unit to the charging voltage via the coil. Additionally, the method comprises operating the switching unit such that the coil is used to convert electrical energy at the charging voltage into electrical energy at the onboard electrical system voltage.

Secondly, the method comprises, when the switching arrangement is meant to be operated in the inverter mode, prompting the isolating switches to decouple the switching unit from the charging voltage. The method further comprises operating the switching unit such that the onboard electrical system voltage is taken as a basis for generating the phase voltage for a phase of the electrical machine.

According to a further aspect, a vehicle (in particular a road vehicle, e.g., a passenger vehicle, a truck or a motorcycle) is described that comprises the switching arrangement described in this document.

According to a further aspect, a software (SW) program is described. The SW program can be configured to be executed on a processor and to thereby carry out the method described in this document.

According to a further aspect, a non-transitory computer-readable storage medium is described. The storage medium can have an SW program configured to be executed on a processor and to thereby carry out the method described in this document.

It should be borne in mind that the methods, apparatuses and systems described in this document can be used either on their own or in combination with other methods, apparatuses and systems described in this document. In addition, any aspects of the methods, apparatuses and systems described in this document can be combined with one another in a wide variety of ways. In particular, the features of the claims can be combined with one another in a wide variety of ways.

The invention is described more specifically below on the basis of exemplary embodiments. In the drawing, Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
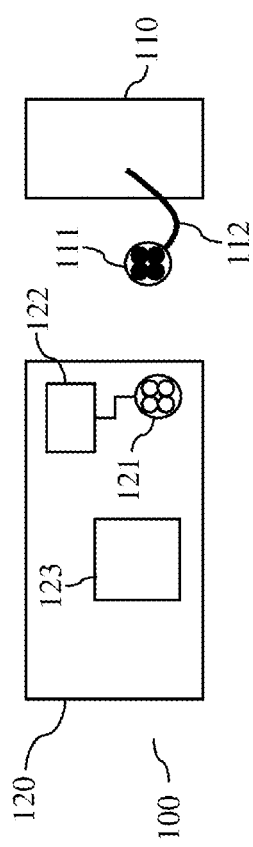
FIG. 1 is a block diagram of an exemplary charging system for an energy store of a vehicle.

As explained in the outset, the present document is concerned with the efficient provision of a step-up converter in a vehicle. In this context, FIG. 1 shows a block diagram of an exemplary charging system 100 having a charging station 110 and a vehicle 120. The vehicle 120 comprises an electrical energy store 122 that can be charged with electrical energy from the charging station 110. The vehicle 120 comprises a charging interface, in particular a charging socket, 121 into which an appropriate connector 111 of a charging cable 112 can be plugged. The charging socket 121 and the connector 111 form a connector system.

The vehicle 120 comprises a controller 123 programmed to control a charging process at the charging station 110. For this purpose, the controller 123 of the vehicle 120 can be programmed to communicate with the charging station 110 according to a predefined communication protocol.

Figure 2A:
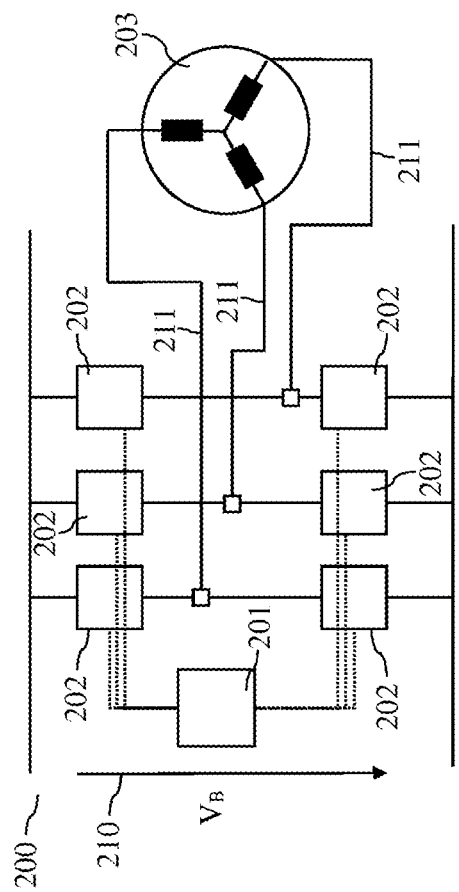
FIG. 2A shows an exemplary inverter for a drive machine of a vehicle.

FIG. 2A shows an exemplary inverter 200 configured to take an onboard electrical system voltage $V_B$ 210 (i.e. a DC voltage) as a basis for generating phase voltages 211 (i.e., AC voltages) for the coils of an electrical machine 203 of the vehicle 120. The inverter 200 comprises multiple switches 202 that are each arranged in a half-bridge for each phase in the example depicted. The switches 202 are actuated by a controller 201 in order to generate the phase voltages 211 for the electrical machine 203.

Figure 2B:
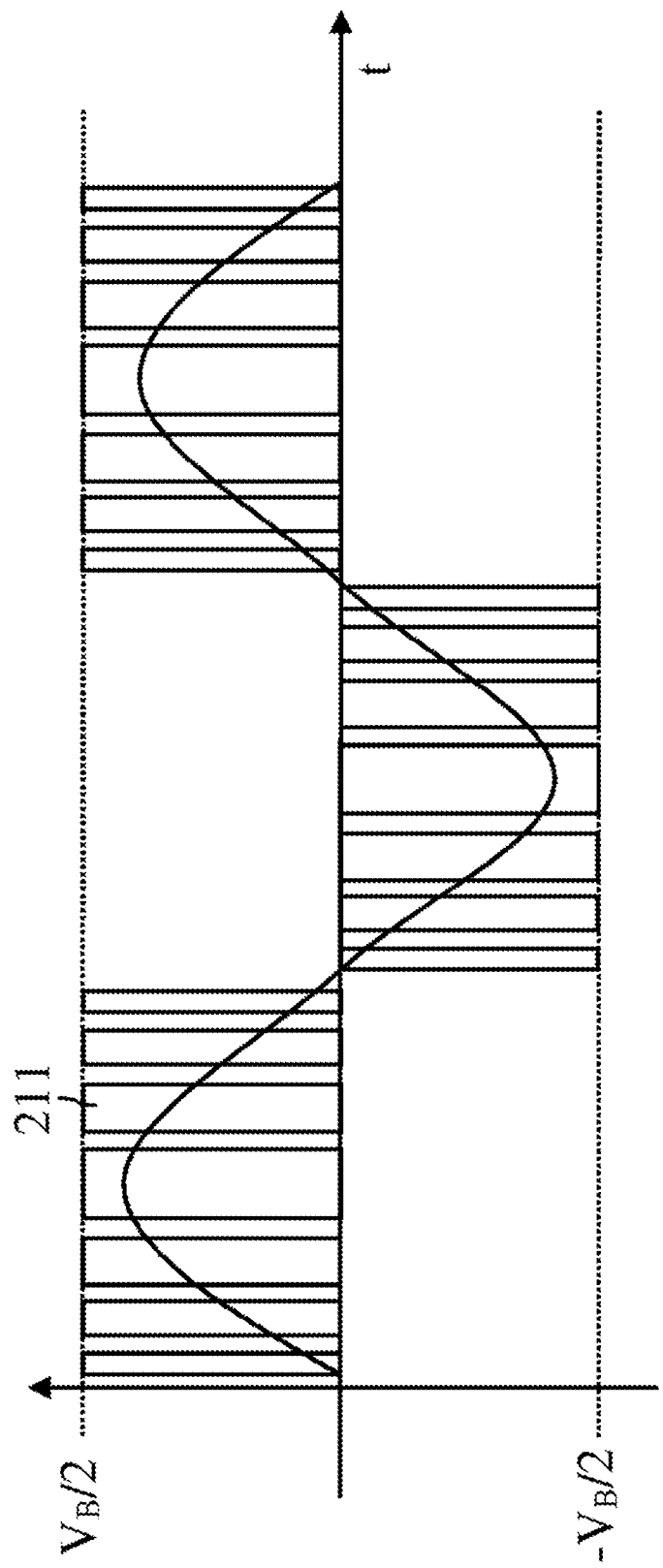
FIG. 2B shows an exemplary characteristic of a phase voltage.

FIG. 2B shows an exemplary phase voltage 211 that is able to be generated by the switches 202 of a half-bridge. As is evident from FIG. 2B, the switches 202 are switched (i.e., opened and closed) at a particular switching frequency.

Figure 2C:
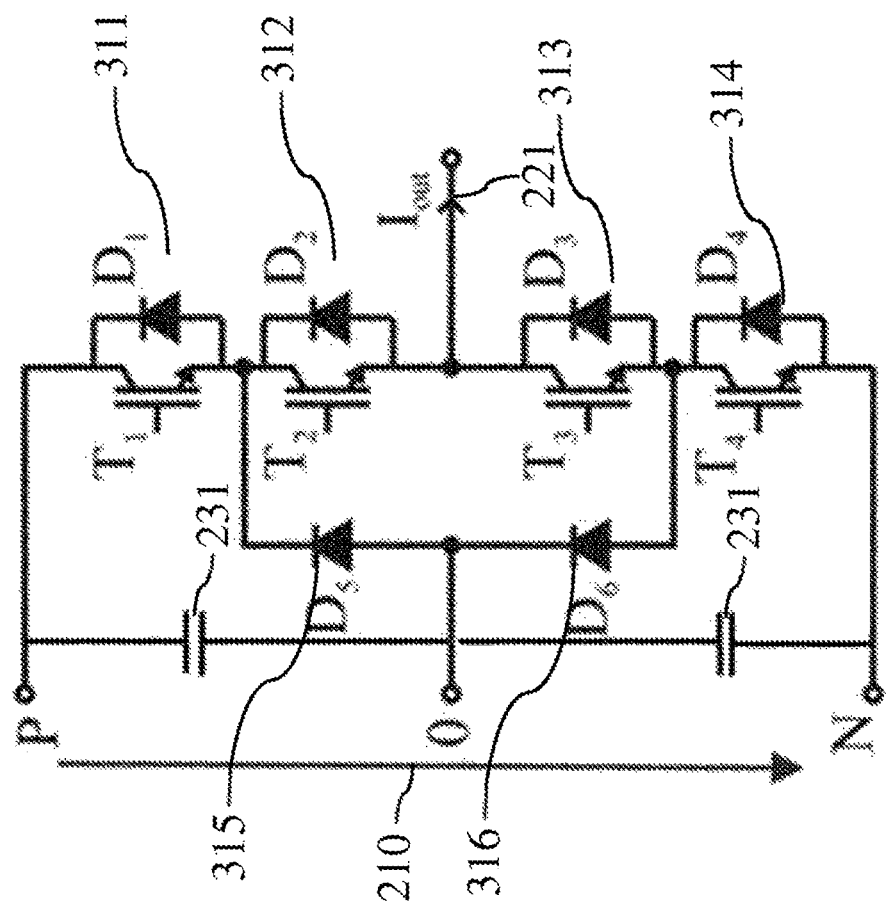
FIG. 2C shows an exemplary switching unit for an inverter.

FIG. 2C shows further details of a phase of an inverter 200, in particular of a 3 level NPC (neutral point clamped)

inverter 200. The inverter 200 can have capacitors 231 for smoothing the onboard electrical system voltage 210 and for providing a neutral level. The inverter 200 comprises switches 202 allowing three different output levels, in particular a $+V_B/2$ level, a neural level (between the capacitors 231) and a $-V_B/2$ level, to be provided, so that a phase voltage 211 or a phase current 221 can be generated at the output of the phase of the inverter 200 with increased accuracy, in particular with an explicit zero crossing. For this purpose, the phase of the inverter 200 comprises first switches or high side switches $T_1$ 311 and $T_2$ 312 that can be used to generate the $+V_B/2$ level, second switches or low side switches $T_3$ 313 and $T_4$ 314 that can be used to generate the $-V_B/2$ level and switches $T_2$ 312 and $D_5$ 315 and/or $T_3$ 313 and $D_6$ 316 that can be used to generate the neutral level.

Figure 2D:
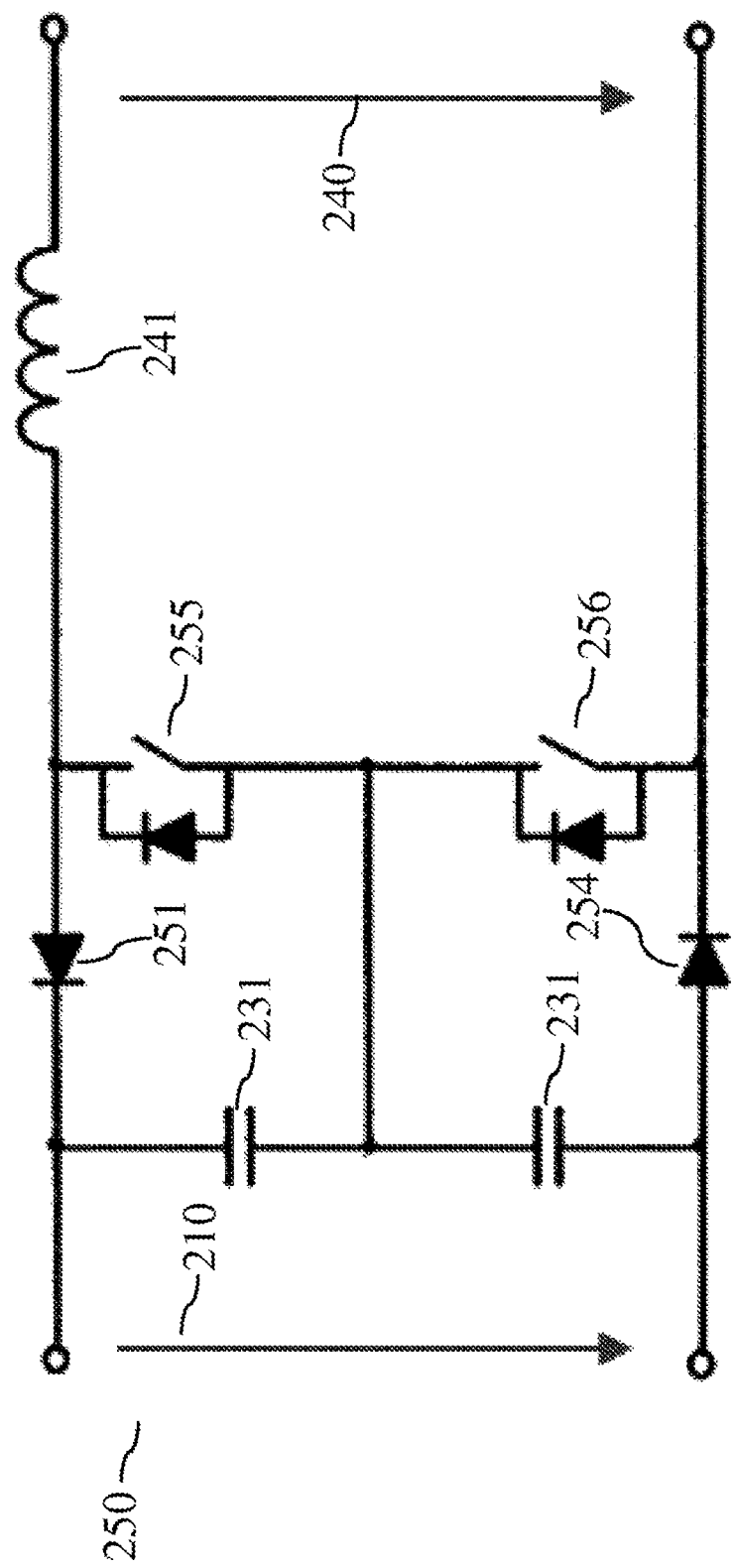
FIG. 2D shows an exemplary DC-DC voltage converter.

As explained in the outset, as high an onboard electrical system voltage 210 as possible (e.g., 800 V) is preferably used in order to transfer as large amounts of energy as possible to the energy store 122 of a vehicle 120. Secondly, the charging voltage used for charging the energy store 122 of the vehicle 120 can be lower than the onboard electrical system voltage 210. FIG. 2D shows an exemplary DC-DC voltage converter 250, in particular a boost converter, configured to step up the charging voltage 240 to the onboard electrical system voltage 210 in order to charge the energy store 122 at the onboard electrical system voltage 210. The DC-DC voltage converter 250 comprises a coil 241, various switches 251, 254, 255, 256 and smoothing capacitors 231.

The installation of an additional DC-DC voltage converter 250 for a charging process entails additional costs and additional installation space/weight. On the other hand, a comparison of FIGS. 2C and 2D shows that the DC-DC voltage converter 250 requires components that are already installed in a phase of the inverter 200. In particular, the switches 202 and capacitors 231 required for a DC-DC voltage converter 250 are already installed in an inverter 200. A phase of an inverter 200 can therefore be used in an efficient manner to provide a DC-DC voltage converter 250.

Figure 3A:
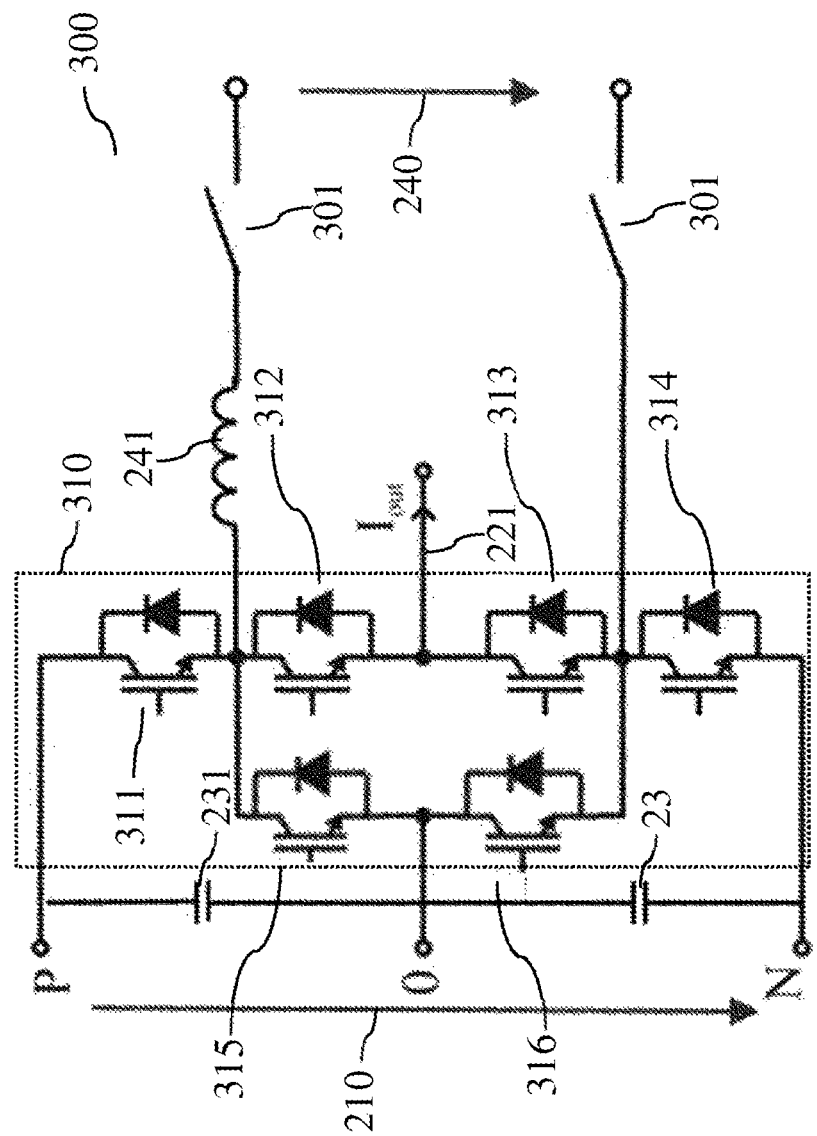
FIG. 3A shows an exemplary switching arrangement having a converter function and an inverter function.

FIG. 3A shows an exemplary combined inverter/DC-DC voltage converter 300 that comprises a common switching matrix or switching unit 310 having switches 202 that can be used both for the inverter function and for the DC-DC voltage converter function. Additionally, the smoothing capacitors 231 can also be used for the inverter function and for the DC-DC voltage converter function. As well as this, the combined inverter/DC-DC voltage converter 300 has a coil 241 that can be connected to, and isolated from, connections or poles for the charging voltage 204 via isolating switches 301.

To provide the inverter function, the isolating switches 301 can be opened, so that the switching matrix 310 can be used to provide a phase current 221. To this end, the switches 311, 312, 313, 314, 315, 316 can be actuated in order to provide the different voltage levels for the phase voltage 211.

To provide the DC-DC voltage converter function, the isolating switches 301 can be closed, so that the coil 241 and operation of the switching matrix 310 can be used to convert electrical energy at the charging voltage 240 into electrical energy at the onboard electrical system voltage 210. To this end, the switches 312 and 313 can remain open in order to decouple the DC-DC voltage converter from the engine 203. The switches 311 and 314 can be operated as diodes but have the orientation of the body diodes of the switches 311, 314 shown in FIG. 3A. The switches 315 and 316 can be closed and opened at a particular PWM frequency. In this case, the PWM duty ratio of the switches 315, 316 can be adapted in order to take the charging voltage 240 as the basis for providing a particular onboard electrical system voltage 210 at the output of the rectifier.

Figure 3B:
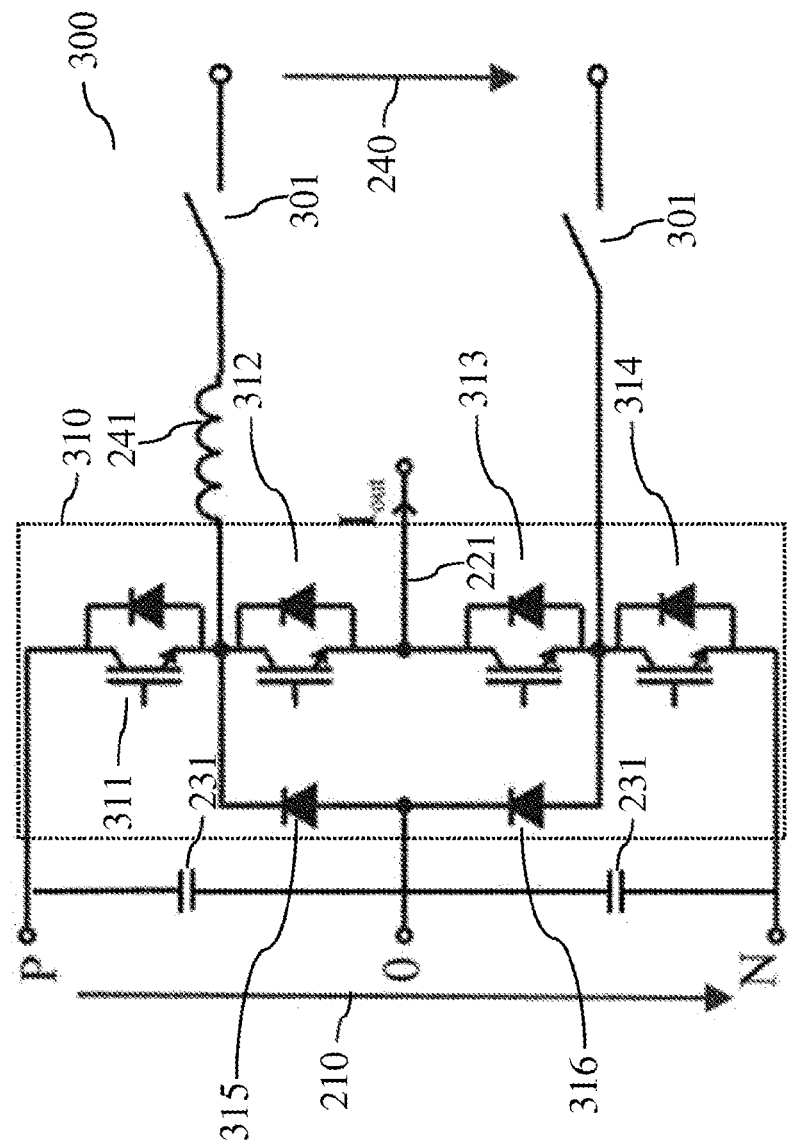
FIG. 3B shows a further exemplary switching arrangement having a converter function and an inverter function.
Figure 3C:
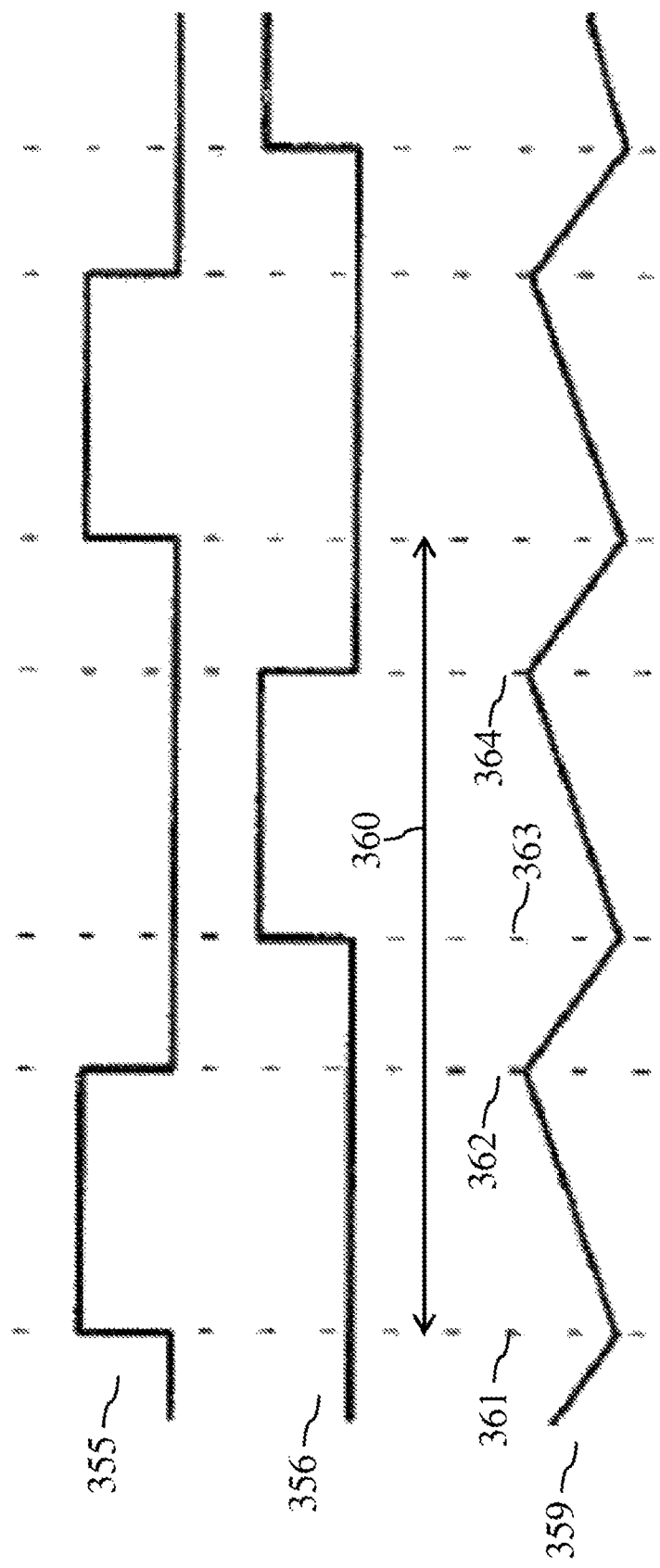
FIG. 3C shows exemplary control signals for the switches of a switching unit in the converter mode.

FIG. 3C shows exemplary actuation signals 355, 356 for actuating the switches 315, 316 when the switching arrangement 300 is operated as a DC-DC voltage converter. At the beginning of a PWM period 360, i.e., at the time 361, the switch 315 can be closed (while the switch 316 remains open). As a result, the coil current 359 through the coil 241 rises (i.e., the coil 241 is magnetized) and flows through the switch 315, the lower capacitor 231 and the switch 314 operated as a diode. The voltage drop across the coil 241 is $V_L-V_B/2$ in this case, $V_L$ being the charging voltage 240 and $V_B$ being the onboard electrical system voltage 210. In this case, it is assumed that the capacitors 231 have the same dimensions (and hence form a capacitive voltage divider for the onboard electrical system voltage 210 that halves the onboard electrical system voltage 210). At the time 262, the switch 315 is closed, so that the coil current 259 flows through the switch 311 operated as a diode, the upper capacitor 231, the lower capacitor 231 and the switch 314 operated as a diode. The coil current 259 falls in this case (i.e., the coil 241 is demagnetized), the voltage drop across the coil 241 being $V_B-V_L$. In the next half of the PWM period 360, the switch 316 is actuated in an appropriate manner at the times 363, 364. As such, the onboard electrical system voltage 240 can be stepped up by means of a three level DC-DC voltage converter in a stable manner.

The switches 315, 316 could possibly just be in the form of passive diodes (as depicted in FIG. 3B). In this case, the active switches 311, 312, 313, 314 can be used to provide a two level rectifier for stepping up the charging voltage 240. In a first portion of a PWM period 360, the switches 312, 313 can be closed (while the switches 311, 314 are open) in order to store energy in the coil 241 (i.e., in order to magnetize the coil 241). The voltage across the coil 241 is then consistent with the charging voltage $V_L$ 240. In a second portion of the PWM period 360, the switches 311, 314 can be closed (while the switches 312, 313 are closed), so that the energy stored in the coil 241 can be forwarded to the output of the DC-DC voltage converter (and the coil 241 is demagnetized). The coil 241 then has the voltage $V_B-V_L$ across it.

Figure 4:
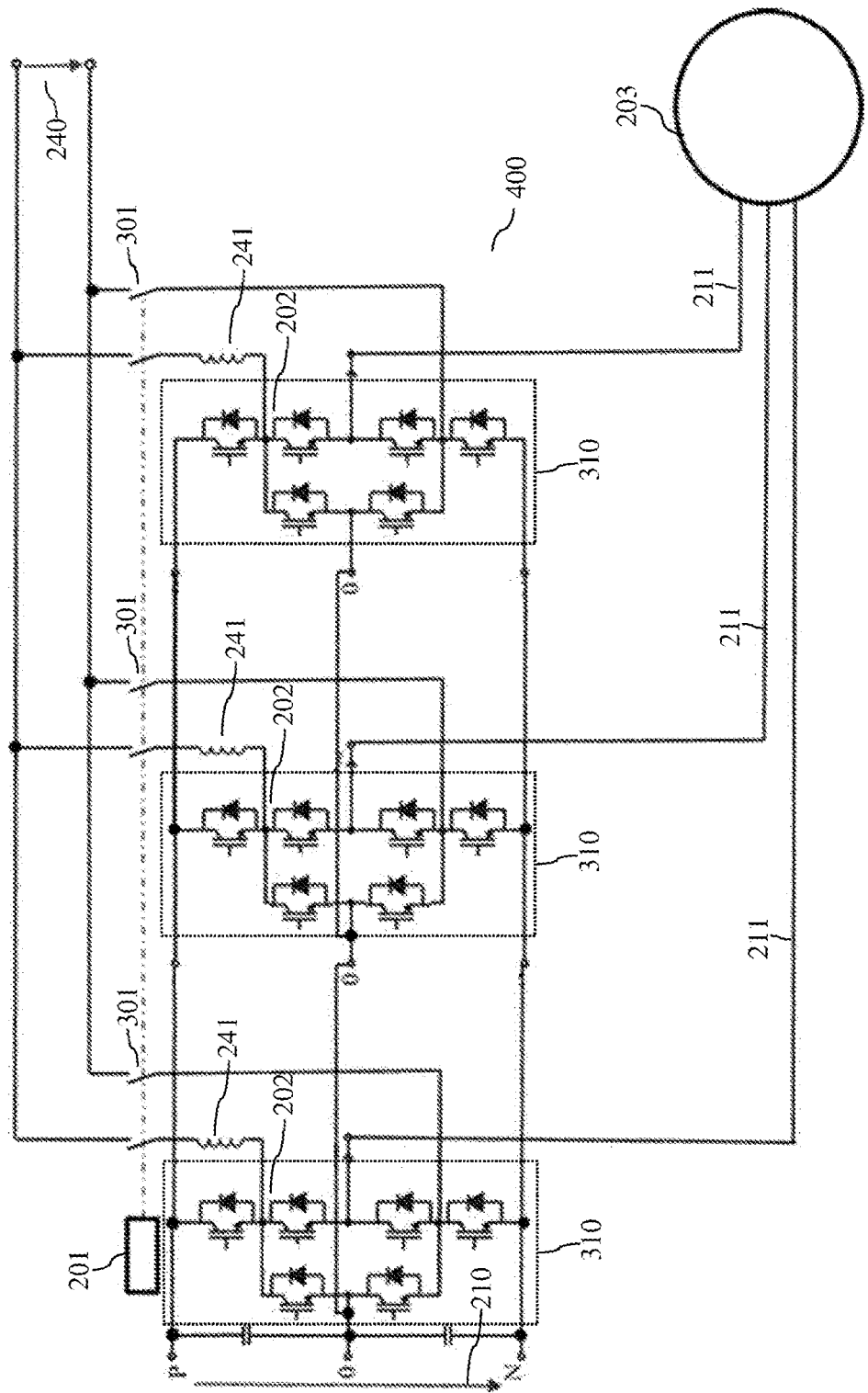
FIG. 4 shows an exemplary switching arrangement having a polyphase converter function and inverter function.

FIG. 4 shows an exemplary switching arrangement 400 in which L=3 phases of the inverter 200 are used to provide a DC-DC voltage converter each. For this purpose, a coil 241 and isolating switches 310 are provided for each phase in order to couple the DC-DC voltage converter to the charging voltage 240. The controller 201 of the inverter 200 can be configured to actuate the switches 202 either for the inverter function (i.e., for an inverter mode) or for the DC-DC voltage converter function (i.e., for a converter mode). In addition, the controller 201 can actuate the isolating switches 301.

In the first variant shown in FIG. 3A, the individual DC-DC voltage converters can be operated in different phases (e.g., with a phase offset of 120° each). It is thus possible for the ripple in the charging current at the output of the DC-DC voltage converters to be reduced. Secondly, in the variant 2 shown in FIG. 3B, there is a coupling between the individual DC-DC voltage converters via the engine 203, which means that the individual DC-DC voltage converters should be operated in sync with one another. The use of multiple parallel DC-DC voltage converters can nevertheless increase the charging power that can be transferred.

Figure 5:
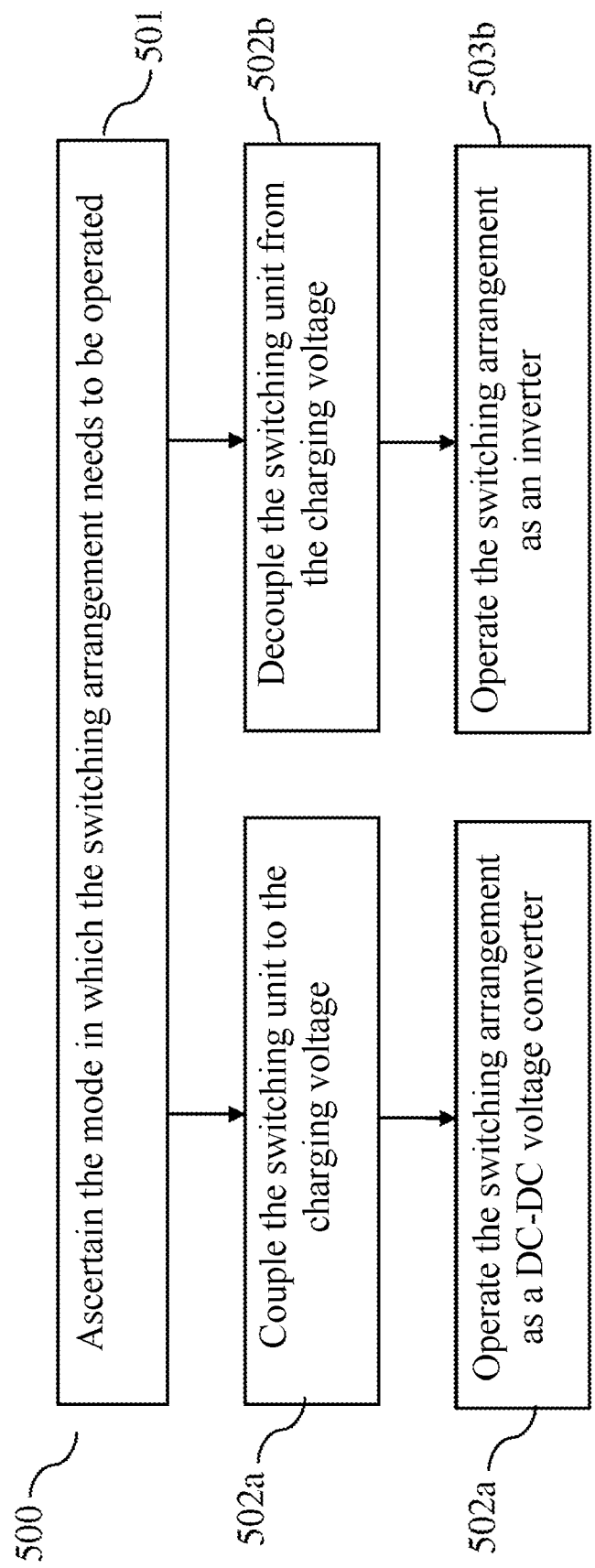
FIG. 5 shows a flowchart for an exemplary method for operating a switching arrangement of a vehicle.

FIG. 5 shows a flowchart for an exemplary method 500 for operating a switching arrangement 400 in a vehicle 120. In this case, the switching arrangement 400 can have both an inverter function and a DC-DC voltage converter function. In particular, the switching arrangement 400 can comprise a switching unit or a switching matrix 310 having multiple switches 311, 312, 313, 314, 315, 316. In this case, the switching unit 310 is configured to couple at least one phase of an electrical machine 203 (in particular of a drive machine) of the vehicle 120 to a DC (direct current) onboard electrical system voltage 210 of the vehicle 120 in different configurations in order to generate an AC (alternating current) phase voltage 211 for the phase of the electrical machine 203. The onboard electrical system voltage 210 can be provided by an electrical energy store 122 (e.g., lithium ion store) of the vehicle 120. The switching unit 310 can therefore provide an inverter 200 for at least one phase of the electrical machine 203.

Additionally, the switching arrangement 200 comprises a coil 241 and isolating switches 301. In this case, the isolating switches 301 are configured to couple the switching unit 310 to a DC charging voltage 240 or to decouple said switching unit from the charging voltage 240 via the coil 241. The charging voltage 240 can be provided, e.g., on a charging interface 121 of the vehicle 120. The coil 241 is coupled to the switching unit 310 such that the coil 241 can be used to provide a DC-DC voltage converter, in particular a step-up converter, between the charging voltage 240 and the onboard electrical system voltage 210.

The method 500 comprises ascertaining 501 whether the switching arrangement 400 is meant to be operated in a converter mode or in an inverter mode. Additionally, the method 500 comprises, when the switching arrangement 400 is meant to be operated in the converter mode, prompting 502a the isolating switches 301 to couple the switching unit 310 to the charging voltage 240 via the coil 241. For this purpose, the isolating switches 301 can be closed. Additionally, the method 500 comprises, when the switching arrangement 400 is meant to be operated in the converter mode, operating 503a the switching unit 310 such that the coil 241 is used to convert electrical energy at the charging voltage 240 into electrical energy at the onboard electrical system voltage 210. It is therefore possible for the switching unit 310 and the coil 241 to be used to provide a switched DC-DC voltage converter.

The method 500 comprises, when the switching arrangement 400 is meant to be operated in the inverter mode, prompting 502b the isolating switches 301 to decouple the switching unit 310 from the charging voltage 240. As a result, it is also possible for the coil 241 to be decoupled from the switching unit 310 or at least switched to zero potential. Additionally, the method 500 comprises, when the switching arrangement 400 is meant to be operated in the inverter mode, operating 503b the switching unit 310 such that the onboard electrical system voltage 210 is taken as a basis for generating the phase voltage 211 for the phase of the electrical machine 203. The switching unit 310 can therefore be operated as an inverter.

The provision of a switching unit 310 that can be used both for charging the energy store 122 and for operating the electrical machine 203 of a vehicle 120 allows the installation space, the weight and the costs of a vehicle 120 to be reduced.

The present invention is not restricted to the exemplary embodiments shown. In particular, it should be borne in mind that the description and the figures are intended to illustrate only the principle of the proposed methods, apparatuses and systems.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A switching arrangement for a vehicle, the switching arrangement comprising:
   a switching unit, having multiple switches, that is configured to couple at least one phase of an electrical machine of the vehicle to a DC onboard electrical system voltage of the vehicle in different configurations in order to generate an AC phase voltage for the phase of the electrical machine;
   a coil and isolating switches, the isolating switching being configured to couple the switching unit to a DC charging voltage or to decouple said switching unit from the charging voltage via the coil; and
   a controller programmed so as,
      in a converter mode, to prompt the isolating switches to couple the switching unit to the charging voltage via the coil, and to operate the switching unit such that the coil is used to convert electrical energy at the charging voltage into electrical energy at the onboard electrical system voltage; and
      in an inverter mode, to prompt the isolating switches to decouple the switching unit from the charging voltage, and to operate the switching unit such that the onboard electrical system voltage is taken as a basis for generating the phase voltage for the phase of the electrical machine.

2. The switching arrangement according to claim 1, wherein
   the switching unit comprises at least one first switch configured to couple or decouple the phase of the electrical machine to or from a first pole of the onboard electrical system voltage;
   the switching unit comprises at least one second switch configured to couple or decouple the phase of the electrical machine to or from a second pole of the onboard electrical system voltage;
   the first and second switches form a half-bridge for the onboard electrical system voltage; and
   the phase of the electrical machine is coupled to a midpoint of the half-bridge.

3. The switching arrangement according to claim 2, wherein
   the switching arrangement comprises a capacitive voltage divider having at least two series capacitors; and
   the capacitive voltage divider is arranged between the first pole and the second pole of the onboard electrical system voltage.

4. The switching arrangement according to claim 3, wherein the switching unit comprises
   at least two first series switches configured to couple or decouple the phase of the electrical machine to or from the first pole of the onboard electrical system voltage;
   a first neutral switch configured to couple or decouple a voltage division point between the two capacitors of the capacitive voltage divider to or from a midpoint between the two first series switches;
   at least two second series switches configured to couple or decouple the phase of the electrical machine to or from the second pole of the onboard electrical system voltage;

a second neutral switch configured to couple or decouple the voltage division point to or from a midpoint between the two second series switches.

5. The switching arrangement according to claim 4, wherein the controller is configured so as, in the inverter mode, to actuate the switching unit in order to take the onboard electrical system voltage as a basis for generating a positive, a negative and a neutral level for the phase voltage.

6. The switching arrangement according to claim 4, wherein the controller is configured so as, in the converter mode, to actuate the switching unit in order to take the charging voltage as a basis for sequentially magnetizing the coil via a first of the capacitors;
demagnetizing the coil via the capacitors of the capacitive voltage divider;
magnetizing the coil via a second of the capacitors; and
demagnetizing the coil via the capacitors of the capacitive voltage divider.

7. The switching arrangement according to claim 4, wherein the coil is coupled firstly to the midpoint between the two first series switches and secondly, via an isolating switch, to a first pole of the charging voltage;
the midpoint between the two second series switches is coupled, via an isolating switch, to a second pole of the charging voltage; and
the controller is programmed so as, in the converter mode, to actuate a first switch and a second switch to decouple the coil and the second pole of the charging voltage from the midpoint of the half-bridge.

8. The switching arrangement according to claim 1, wherein the controller is programmed so as, in the converter mode, to actuate the switching unit in order to take the charging voltage as a basis for sequentially arranging the coil directly or indirectly between a first and a second pole of the charging voltage in order to magnetize the coil; and
arranging the coil between the first pole of the onboard electrical system voltage and the first pole of the charging voltage in order to demagnetize the coil.

9. The switching arrangement according to claim 1, wherein the switching arrangement comprises L switching units for L phases of the electrical machine, where L>1;
the switching arrangement comprises L coils and L sets of isolating switches that are each coupled to one of the L switching units and to the charging voltage; and
the controller is programmed so as, in the converter mode, to operate the L switching units such that L parallel, phase-shifted, DC-DC voltage converters are provided between the charging voltage and the onboard electrical system voltage.

10. A method for operating a switching arrangement in a vehicle, wherein the switching arrangement (400) comprises a switching unit having multiple switches; wherein the switching unit is configured to couple at least one phase of an electrical machine of the vehicle to a DC onboard electrical system voltage of the vehicle in different configurations in order to generate an AC phase voltage for the phase of the electrical machine; and
a coil and isolating switches; wherein the isolating switches are configured to couple the switching unit to a DC charging voltage or to decouple said switching unit from the charging voltage via the coil;
the method comprising:

ascertaining whether the switching arrangement is meant to be operated in a converter mode or in an inverter mode;
in a case that the switching arrangement is meant to be operated in the converter mode,
prompting the isolating switches to couple the switching unit to the charging voltage via the coil; and
operating the switching unit such that the coil is used to convert electrical energy at the charging voltage into electrical energy at the onboard electrical system voltage; and
in a case that the switching arrangement is meant to be operated in the inverter mode,
prompting the isolating switches to decouple the switching unit from the charging voltage; and
operating the switching unit such that the onboard electrical system voltage is taken as a basis for generating the phase voltage for the phase of the electrical machine.

11. The switching arrangement according to claim 5, wherein the controller is configured so as, in the converter mode, to actuate the switching unit in order to take the charging voltage as a basis for sequentially magnetizing the coil via a first of the capacitors;
demagnetizing the coil via the capacitors of the capacitive voltage divider;
magnetizing the coil via a second of the capacitors; and
demagnetizing the coil via the capacitors of the capacitive voltage divider.

12. The switching arrangement according to claim 5, wherein the coil is coupled firstly to the midpoint between the two first series switches and secondly, via an isolating switch, to a first pole of the charging voltage;
the midpoint between the two second series switches is coupled, via an isolating switch, to a second pole of the charging voltage; and
the controller is programmed so as, in the converter mode, to actuate a first switch and a second switch to decouple the coil and the second pole of the charging voltage from the midpoint of the half-bridge.

13. The switching arrangement according to claim 6, wherein the coil is coupled firstly to the midpoint between the two first series switches and secondly, via an isolating switch, to a first pole of the charging voltage;
the midpoint between the two second series switches is coupled, via an isolating switch, to a second pole of the charging voltage; and
the controller is programmed so as, in the converter mode, to actuate a first switch and a second switch to decouple the coil and the second pole of the charging voltage from the midpoint of the half-bridge.

14. The switching arrangement according to claim 2, wherein the controller is programmed so as, in the converter mode, to actuate the switching unit in order to take the charging voltage as a basis for sequentially arranging the coil directly or indirectly between a first and a second pole of the charging voltage in order to magnetize the coil; and
arranging the coil between the first pole of the onboard electrical system voltage and the first pole of the charging voltage in order to demagnetize the coil.

15. The switching arrangement according to claim 3, wherein the controller is programmed so as, in the converter mode, to actuate the switching unit in order to take the charging voltage as a basis for sequentially arranging the coil directly or indirectly between a first and a second pole of the charging voltage in order to magnetize the coil; and arranging the coil between the first pole of the onboard electrical system voltage and the first pole of the charging voltage in order to demagnetize the coil.

16. The switching arrangement according to claim 4, wherein the controller is programmed so as, in the converter mode, to actuate the switching unit in order to take the charging voltage as a basis for sequentially arranging the coil directly or indirectly between a first and a second pole of the charging voltage in order to magnetize the coil; and arranging the coil between the first pole of the onboard electrical system voltage and the first pole of the charging voltage in order to demagnetize the coil.

17. The switching arrangement according to claim 2, wherein the switching arrangement comprises L switching units for L phases of the electrical machine, where L>1;

the switching arrangement comprises L coils and L sets of isolating switches that are each coupled to one of the L switching units and to the charging voltage; and the controller is programmed so as, in the converter mode, to operate the L switching units such that L parallel, phase-shifted, DC-DC voltage converters are provided between the charging voltage and the onboard electrical system voltage.

18. The switching arrangement according to claim 3, wherein the switching arrangement comprises L switching units for L phases of the electrical machine, where L>1;

the switching arrangement comprises L coils and L sets of isolating switches that are each coupled to one of the L switching units and to the charging voltage; and the controller is programmed so as, in the converter mode, to operate the L switching units such that L parallel, phase-shifted, DC-DC voltage converters are provided between the charging voltage and the onboard electrical system voltage.

19. The switching arrangement according to claim 4, wherein the switching arrangement comprises L switching units for L phases of the electrical machine, where L>1;

the switching arrangement comprises L coils and L sets of isolating switches that are each coupled to one of the L switching units and to the charging voltage; and the controller is programmed so as, in the converter mode, to operate the L switching units such that L parallel, phase-shifted, DC-DC voltage converters are provided between the charging voltage and the onboard electrical system voltage.

20. The switching arrangement according to claim 5, wherein the switching arrangement comprises L switching units for L phases of the electrical machine, where L>1;

the switching arrangement comprises L coils and L sets of isolating switches that are each coupled to one of the L switching units and to the charging voltage; and the controller is programmed so as, in the converter mode, to operate the L switching units such that L parallel, phase-shifted, DC-DC voltage converters are provided between the charging voltage and the onboard electrical system voltage.

* * * * *